(12) United States Patent
Radosav

(10) Patent No.: US 6,398,223 B1
(45) Date of Patent: Jun. 4, 2002

(54) MECHANICAL FACE SEAL

(75) Inventor: Jon J. Radosav, Norridge, IL (US)

(73) Assignee: John Crane Inc., Morton Grove, IL (US)

( * ) Notice: Subject to any disclaimer, the term of this patent is extended or adjusted under 35 U.S.C. 154(b) by 2 days.

(21) Appl. No.: 09/643,045

(22) Filed: Aug. 21, 2000

(51) Int. Cl.$^7$ ................................................. F16J 15/32
(52) U.S. Cl. ..................... 277/352; 277/358; 277/368; 277/369
(58) Field of Search ................................ 277/352, 358, 277/368, 369, 370, 377, 379

(56) References Cited

U.S. PATENT DOCUMENTS

| | | |
|---|---|---|
| 1,063,633 A | 6/1913 | Wilkinson |
| 1,561,426 A | 11/1925 | Fischbackher |
| 1,780,248 A | 11/1930 | Spreen |
| 2,000,341 A | 5/1935 | Larsh |
| 2,014,932 A | 9/1935 | Hallett |
| 2,167,669 A | 8/1939 | Molyneux |
| 2,189,197 A | 2/1940 | Cerny |
| 2,249,930 A | 7/1941 | Bailey |
| 2,267,994 A | 12/1941 | Reynolds |
| 2,299,590 A | 10/1942 | Reynolds |
| 2,322,834 A | 6/1943 | Dornhofer |
| 2,393,260 A | 1/1946 | Pardee |
| 2,446,243 A | 8/1948 | Reynolds |
| 2,465,546 A | 3/1949 | Marslek |
| 2,814,512 A | 11/1957 | Quinn et al. |
| 2,866,656 A | 12/1958 | Dobrosavljevic |
| 2,939,730 A | 6/1960 | Turpin |
| 2,994,547 A | 8/1961 | Dolhun et al. |
| 3,024,048 A | 3/1962 | Kobert |
| 3,061,318 A | 10/1962 | Laser |
| 3,131,943 A | 5/1964 | Mueller |
| 3,203,704 A | 8/1965 | Mueller |
| 3,332,692 A | 7/1967 | Mueller |
| 3,391,939 A | 7/1968 | Mueller |
| 3,391,941 A | 7/1968 | Mueller |
| 3,480,285 A | 11/1969 | Anderson |
| 3,507,504 A | 4/1970 | Donley |
| 3,575,424 A | 4/1971 | Taschenberg |
| 3,895,811 A | 7/1975 | Richard, Jr. et al. |
| 3,948,533 A | 4/1976 | Novosad |

(List continued on next page.)

FOREIGN PATENT DOCUMENTS

| | | |
|---|---|---|
| AU | 144296 | 11/1951 |
| GB | 6115 | of 1906 |
| GB | 308391 | 3/1929 |
| GB | 548051 | 9/1942 |
| GB | 799010 | 7/1958 |

*Primary Examiner*—Anthony Knight
*Assistant Examiner*—Matthew E. Rodgers
(74) *Attorney, Agent, or Firm*—Jenner & Block

(57) ABSTRACT

A mechanical face seal comprising two seal rings for use in water pumps and other fluids, including a resilient bellows for providing a secondary seal between one seal ring and either a housing or a rotating shaft extending through an aperture in the housing. The resilient bellows preferably comprises an elastomeric material, such as molded rubber, and has a single convolution having a general cross-sectional shape of an inverted "omega." A finger spring member comprises a plurality of generally "U" shaped spring fingers which are adapted and deformed upon installation to provide an axial biasing force against the seal ring attached to the resilient bellows so as to urge it toward the other ring. In a preferred embodiment, the resilient bellows includes a ferrule for providing radially inward force on a flange portion of the bellows to maintain the secondary seal between the bellows and the seal ring, and a corresponding second ferrule at a flange portion disposed opposite the axial end of the bellows which provides a secondary seal between the bellows and either the shaft or the housing. Preferably, the seal elements are associated with a shaft sleeve and a retainer to present the seal as a cartridge for easy installation.

9 Claims, 4 Drawing Sheets

U.S. PATENT DOCUMENTS

| | | |
|---|---|---|
| 4,275,889 A | 6/1981 | Butler et al. |
| 4,700,041 A | 10/1987 | Morita et al. |
| 4,754,981 A | 7/1988 | Burns |
| 4,779,876 A | 10/1988 | Novosad |
| 5,037,065 A | 8/1991 | Hirz et al. |
| 5,123,660 A | 6/1992 | Dahlheimer et al. |
| 5,163,692 A * | 11/1992 | Schofield et al. ........... 277/153 |
| 5,199,720 A | 4/1993 | Radosav et al. |
| 5,226,787 A | 7/1993 | Freeman |
| 5,492,340 A | 2/1996 | Lederman |
| 5,676,382 A | 10/1997 | Dahlheimer |
| 5,947,479 A | 9/1999 | Ostrowski |
| 6,007,069 A | 12/1999 | Sadowski |

* cited by examiner

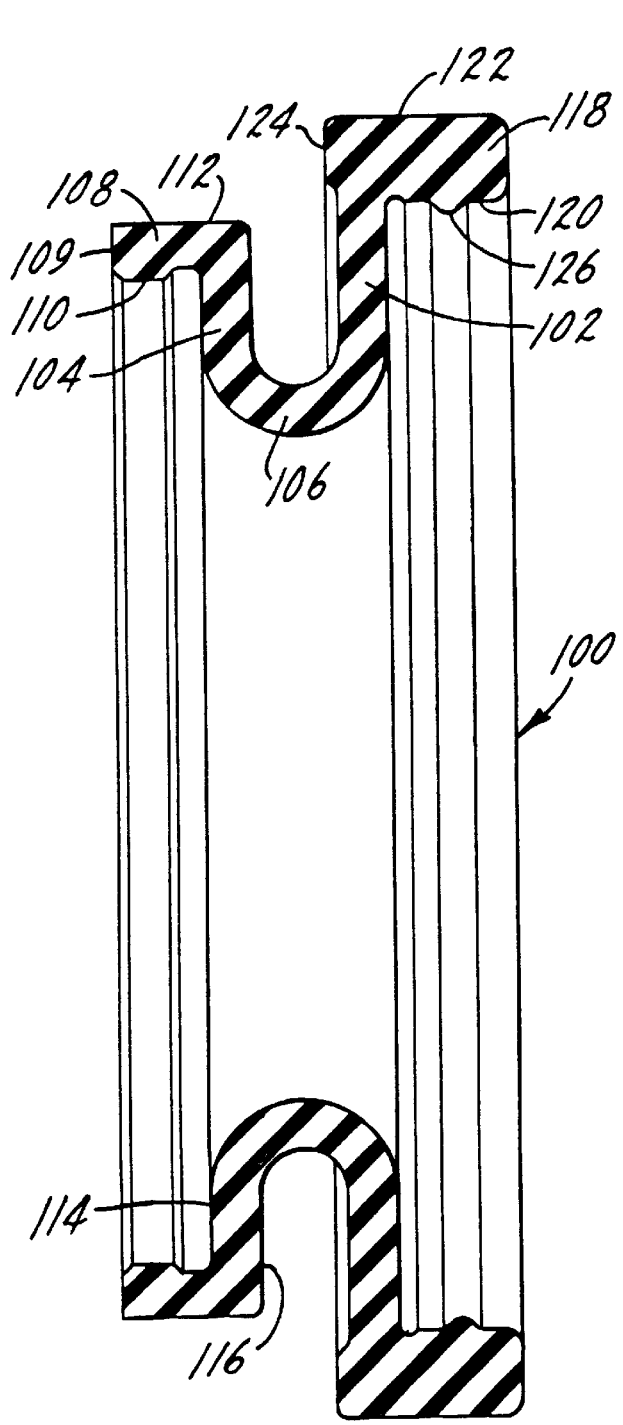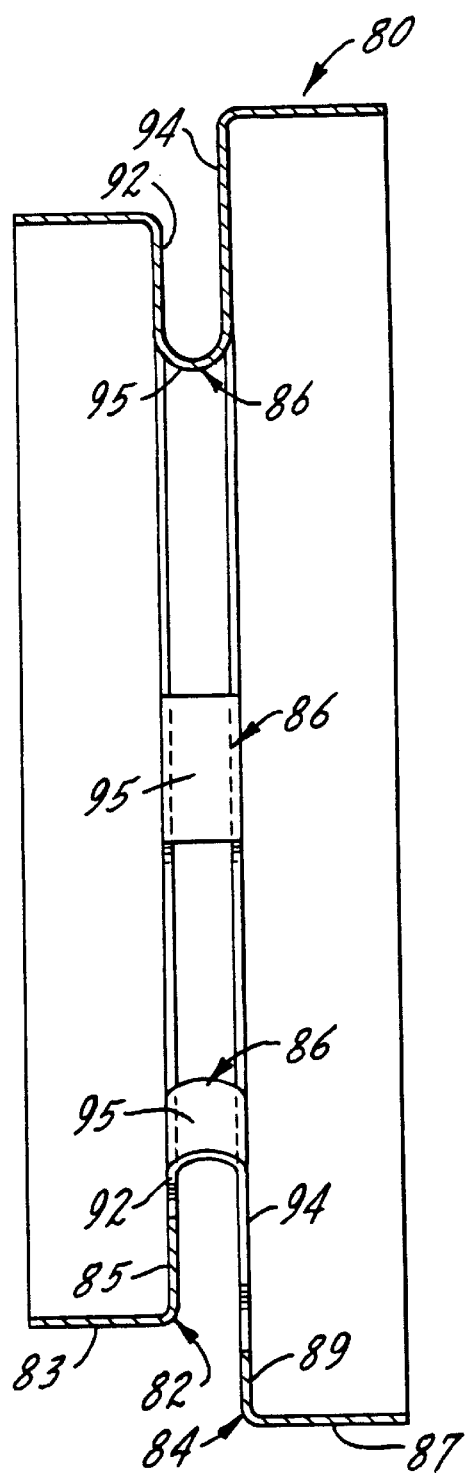

MECHANICAL FACE SEAL

This invention relates to mechanical face seats which provide a fluid-tight seal between a housing and a rotatable shaft. More particularly, it relates to such seals that include a finger-type spring to provide an axial bias and a secondary seal formed of a rubber or elastomeric bellows.

BACKGROUND OF THE INVENTION

Seals of the general type are large volume, low cost and are particularly suitable for use in automotive water pumps. Other applications of such seals include other water pumps, such as marine bilge pumps, and pumps for various other liquids.

Seals currently in common use typically include a primary and mating ring defining relatively rotating sealing faces. These rings may be made of silicon carbide or carbon. A coil spring provides an axial bias, and an elastomeric or rubber bellows provides a secondary seal between the axially movable primary ring and its associated housing or shaft. Examples are found in U.S. Pat. Nos. 4,275,889; 4,779,876 and 5,199,719. Similar seals that have a different form of secondary seal or biasing means are shown in U.S. Pat. Nos. 4,754,981 and 5,947,479.

Bellows-type seals have enjoyed significant commercial success. Ongoing demand for improved productivity, reliability, durability and changing envelope requirements within the associated pump dictate continued effort for new developments. The present invention represents an advance in seal technology that addresses these needs.

SUMMARY OF THE INVENTION

The present invention is directed to a mechanical seal assembly which utilizes a finger-type spring to provide the axial load upon the axially movable seal ring. Also, a unique elastomeric bellows is provided which provides the secondary seal and includes a single convolution between its connection to the axially movable seal ring and its connection to the associated housing or shaft.

BRIEF DESCRIPTION OF THE DRAWINGS

FIG. 3 is a side sectional view of the secondary seal bellows of the embodiment of FIG. 1.

FIG. 5 is a side sectional sectional view of the finger spring member of the embodiment of FIG. 1, taken approximately along line 5—5 of FIG. 4.

DETAILED DESCRIPTION OF THE PREFERRED EMBODIMENTS

Figure 1:
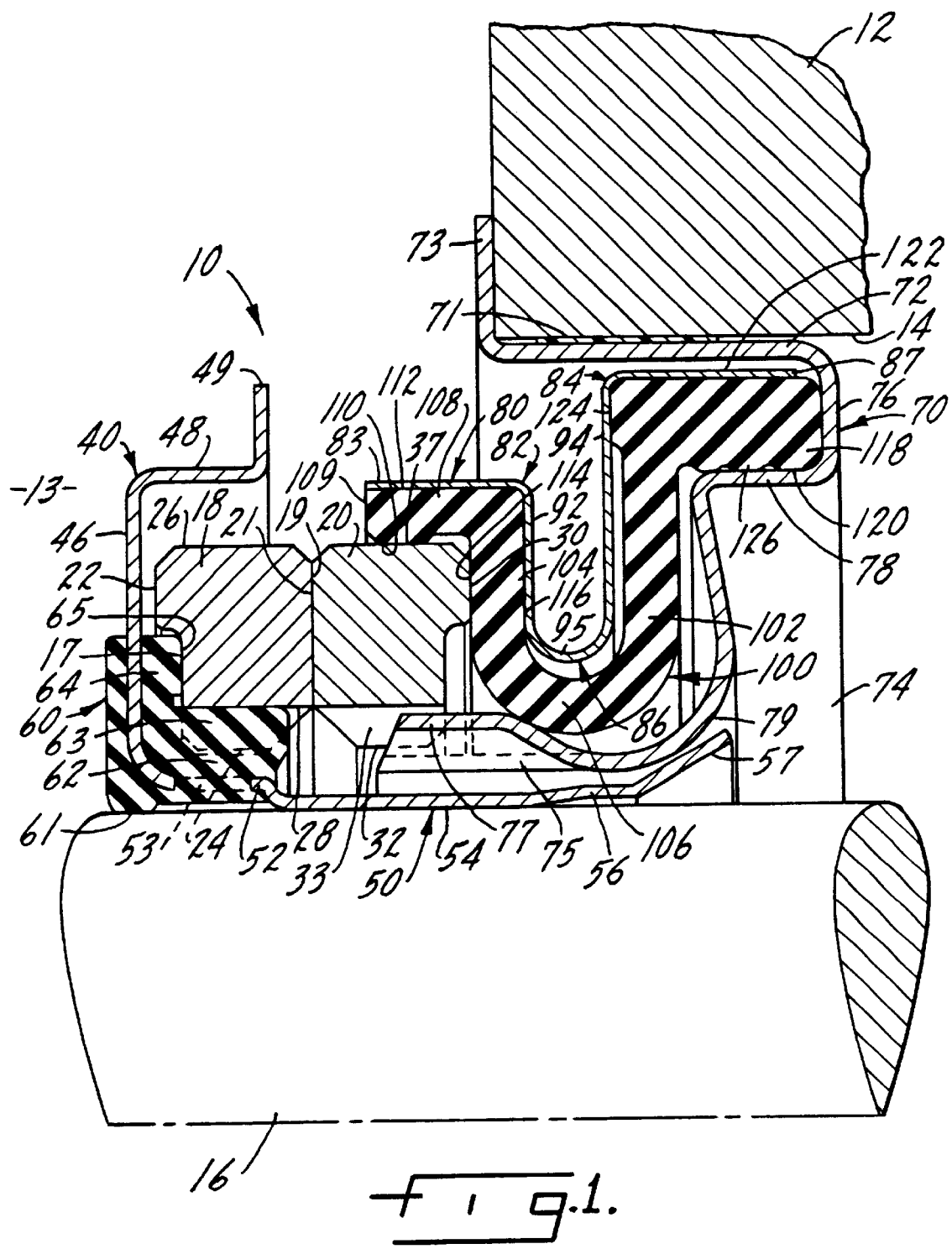
FIG. 1 is a sectional elevational view of a mechanical face seal assembly, prior to preloading, which embodies the present invention.

The accompanying drawings, FIGS. 1–5, illustrate one embodiment of a mechanical face seal assembly, generally designated 10, according to the present invention. Seal assembly 10 is installed between a housing 12 having a bore or passage 14 through which a relatively rotating shaft 16 extends. The seal assembly provides a fluid-tight seal between the housing 12 and the relatively rotating shaft 16.

The housing 12 may be a water pump or other device in which a shaft extends through an aperture in the surrounding housing. It is contemplated, however, that the seal assembly 10 could have application in a wide variety of pumps and other devices, particularly, pumps with small diameter shafts. The fluid may be water, or water based, or even oil.

Figure 2:
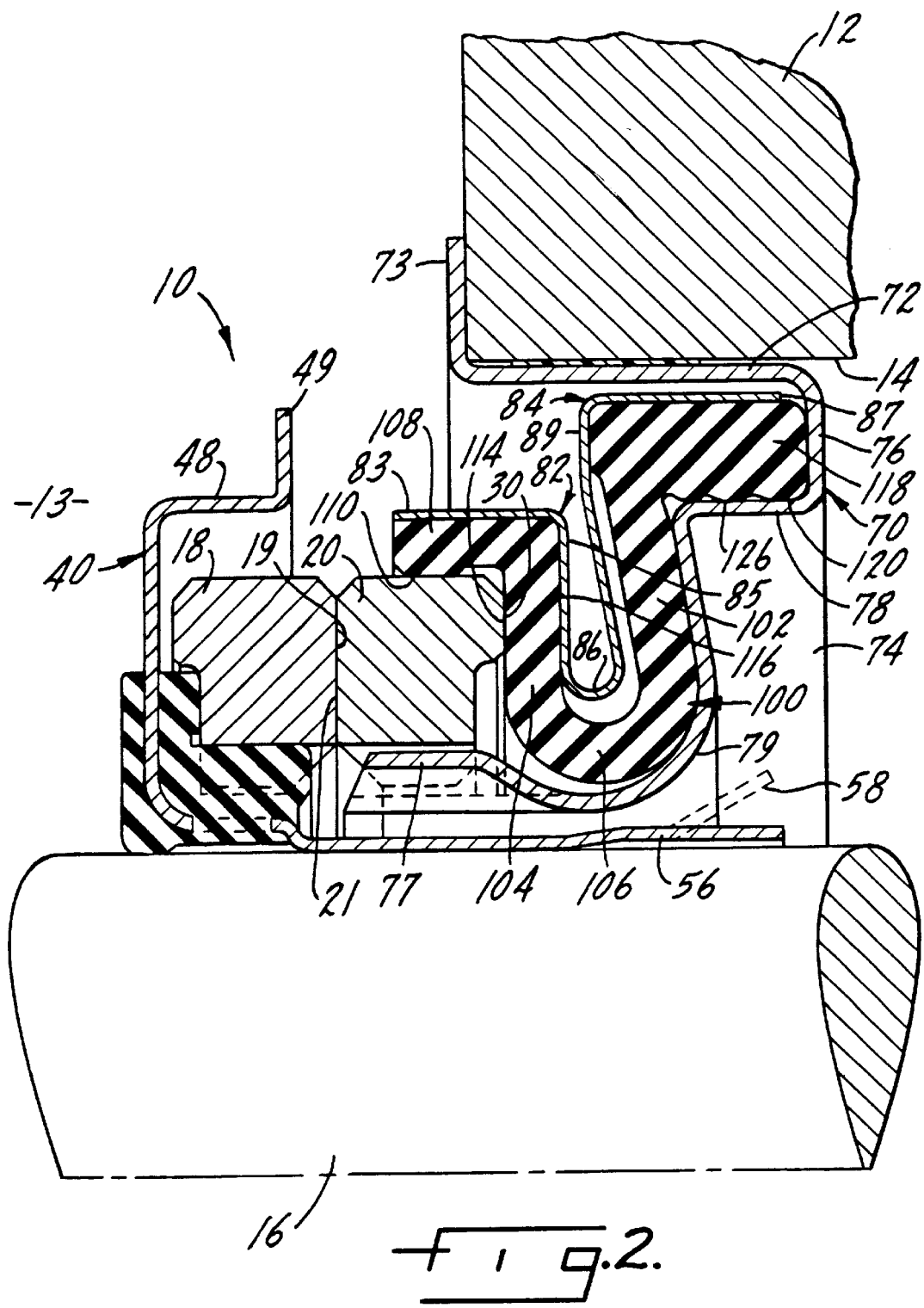
FIG. 2 is a sectional elevational view of the mechanical face seal assembly, shown in FIG. 1, in its installed position and preloaded within an illustrative pump.
Figure 4:
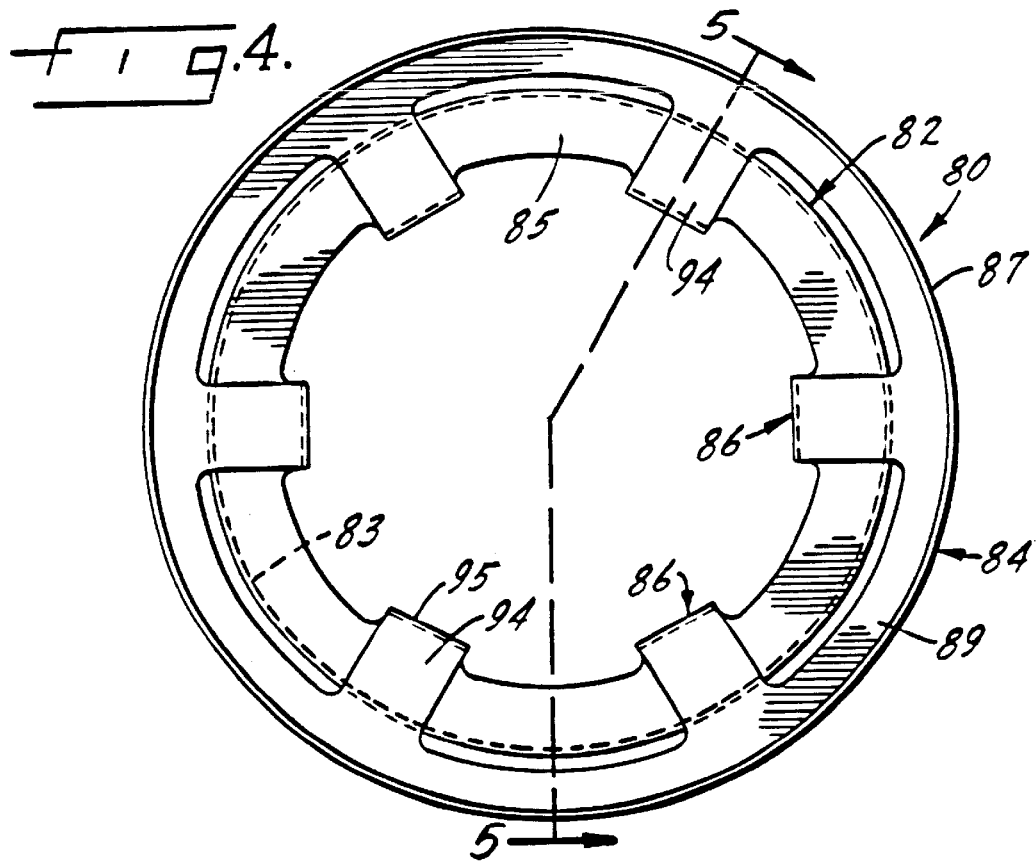
FIG. 4 is a plan view of the finger spring member of the embodiment of FIG. 1.

The housing of the embodiment illustrated in FIGS. 1 and 2 is part of a pump, such as a water or other liquid pump, in which an impeller (not shown) rotatable by the shaft 16 elevates the pressure of the liquid to be sealed. FIG. 1 shows the seal elements installed on a shaft 16 within a housing 14, but prior to loading the seal rings to a predetermined minimum installed working height, as will be explained. FIG. 2 shows a similar seal in the working position with the spring preloaded. As shown in FIG. 1, the liquid is contained in space 13 inboard the housing 12, and the impeller would be disposed to the left side of seal assembly 10. In describing the illustrated embodiments, the term "inboard" is used to make reference to the pressure side of the pump and the term "outboard" is used to refer to the ambient environment external to the pump, i.e., the atmosphere. The term "radially inwardly" means toward shaft and "radially outward" means away from the shaft.

Though shown in cross-section in FIGS. 1, 2, 3 and 5, it should be readily apparent that the seal assembly components are annular, as are the various surfaces of these components which are described in detail.

As illustrated in FIG. 1, each seal assembly includes a pair of annular sealing rings including mating ring 18 and primary ring 20 associated respectively with shaft 16 and housing 12. These rings respectively define mating sealing faces 19 and 21 which are in facing, sealing relation and define a seal interface.

The sealing rings 18 and 20 are shown as contained in carriers comprising a cylindrical sleeve 40 and an annular shell or retainer 70. Sleeve 40 includes tubular elongate portion 50 arranged to attach to the shaft 16 to secure the ring 18 for rotation with the shaft 16. Retainer 70 includes axially extending cylindrical outer wall portion 72 arranged to connect the ring 20 to associated housing 12.

In this embodiment, these latter elements are configured to form a cartridge or unitary seal assembly which may be installed into position as a unitary component. It should be understood, however, the invention does not require that the seal assembly be unitized. Moreover, it is not necessary in every aspect of the invention that a sleeve and retainer be incorporated in the seal assembly. The operative components may be otherwise attached to the housing and shaft in an alternate manner with the sleeve or retainer or both components eliminated.

Primary ring 20 is axially movable. It is biased toward ring 18 by spring 80, shown in detail in FIGS. 4 and 5, which is a finger-type spring. An elastomeric bellows 100, shown in detail in FIG. 3, provides a fluid-tight secondary seal between ring 20 and the retainer 70. It also permits axial movement of the ring 20 without affecting the secondary seal between the ring 20 and retainer 70.

Referring to FIG. 1, mating ring 18 is fixed axially relative to shaft 16 and housing 12. It includes an annular radial surface 22 spaced axially inboard from radial sealing face 19, and includes a counterbore 17. It also includes an inner cylindrical surface 24 having a larger diameter than the diameter of the tubular elongate portion 50. The inner cylindrical surface 24 is provided with drive notches 28 equally spaced about the inner periphery of the ring 20. It should be noted that the axially movable primary ring 20 could be associated with shaft 16, and mating ring 18 could be fixed to housing 12.

Primary ring 20 includes outboard radial surface 30, spaced outboard of seal face 21. Ring 20 also includes an inner axial cylindrical surface 32 having a diameter larger than the diameter of the tubular elongate portion 50 of sleeve 40 to permit axial movement of the ring. Surface 32 is provided with a plurality of notches 33. Primary ring 20 includes axially extending cylindrical surface 37 that defines its radially outer periphery.

Referring to FIG. 1, shaft sleeve 40 supports mating ring 18 upon shaft 16. Shaft sleeve 40 includes a tubular elongate portion 50 defining inboard enlarged portion 52, shaft engaging portion 54 and outboard enlarged portion 56. Outboard enlarged portion 56 is sized to facilitate placement of the seal assembly upon shaft 16 during installation. The axial end of outboard enlarged portion 56 is preferably swaged outwardly after assembly as at 57 to retain the curved wall portion 79 of retainer 70, and thus retain the seal as a cartridge before installation. Alternatively, outboard enlarged portion 56 may include a plurality of tabs 58 (as shown in phantom in FIG. 2) to maintain the sleeve 40 and retainer 70 as a unitized seal assembly until the seal 10 is installed. Inboard enlarged portion 52 defines a plurality of holes 53 for purposes that will be explained.

Shaft sleeve 40 defines a seal ring receptacle comprising flange 46 which is radial. Shaft sleeve 40 further comprises an annular cylindrical wall 48 and a radial wall 49. Wall 48 is of a diameter larger than outer cylindrical surface 26 of ring 18. Walls 48 and 49 of sleeve 40 provide protection for the seal ring 18 against damage from contact with other objects, such as other similar seal assemblies which may come in contact with each other during handling or storage prior to installation. These wall portions may be eliminated or modified in shape without departing from the principles of the invention.

An elastomeric support and secondary seal 60 is molded onto the inboard enlarged portion 52 of tubular elongate portion 50. It is mechanically secured to the sleeve 40 during the molding process at holes 53 in the inboard enlarged portion 52.

Molded support and secondary seal 60 defines an inboard annular bead 61 which engages the outer surface of shaft 16 to provide a sealed relationship between the shaft 16 and the sleeve 40. Bead 61 also assists the metal to metal interference fit between shaft engaging portion 54 of tubular elongate portion 50 and shaft 16, so as to maintain the axial position of sleeve 40 relative to shaft 16. Bead 61 becomes compressed against the shaft, as shown in FIG. 1, when installed.

Elastomeric support and secondary seal 60 defines a ring seal and drive portion radially outward of enlarged inboard portion 52 of sleeve 40. It includes axial drive portion 62 that extends between enlarged inboard portion 52 and inner cylindrical surface 24 of seal ring 18. Portion 62 defines drive lugs 63 disposed within drive notches 28 formed in inner cylindrical surface 24. This relationship retains the annular seal ring 18 against rotation relative to sleeve 40.

Elastomeric support and secondary seal 60 further defines an integrally formed annular seal portion 64 compressed between radial wall 46 of sleeve 40 and mating ring 18. It defines radial sealing surface 65 in fluid tight contact with ring 18 within counterbore 17.

The primary ring 20 is supported relative to housing 12 by annular stamped metal primary ring retainer 70. The retainer 70 comprises axially extending cylindrical outer wall portion 72, a radial rim 73, a radially extending, annular, outboard, portion 74 and an axially extending generally cylindrical inner wall portion 75.

The axially extending cylindrical outer wall portion 72 has a predetermined diameter which is received in the bore 14 of housing 12. The housing bore 14 is sized such that the cylindrical portion 72 may be press-fit into the bore 14 to create a fluid-tight relationship between the retainer 70 and the housing 12. A layer of latex or other appropriate material 71 may be applied to the outer diameter surface of wall 72 to ensure a fluid-tight seal between the retainer 70 and the housing 12. The radial rim 73 seats against a radial surface of the wall of the housing 12 to provide a stop to precisely axially position the retainer 70 relative to the housing 12 and to the shaft 16.

The generally radial outboard portion 74 defines a radial annular wall portion 76 connecting axially extending cylindrical outer wall portion 72 with an axially extending cylindrical seat wall portion 78. Seat wall portion 78 defines a seat to receive a portion of a bellows 100 in fluid-tight relation, as will be explained.

Generally radial outboard portion 74 further defines a generally radially extending curved wall portion 79. Radially extending, curved wall portion 79 connects with axially extending cylindrical inner wall portion 75, sized to be of a diameter larger than tubular elongate portion 50 to permit relative axial movement between sleeve 40 and retainer 70 on installation. Detents 77 formed in cylindrical inner wall portion 75 engage notches 33 in primary ring 20. The inner axial surface 32 of primary ring 20 is of a diameter larger than axially extending cylindrical inner wall portion 75 to permit axial movement of primary ring 20 relative to retainer 70. The inter-engagement between notches 33 and detents 77 precludes rotation of the primary ring 20 relative to the retainer 70 which is, in turn, fixed to the housing 12.

A secondary seal between the primary ring 20 and retainer 70 is provided by elastomeric bellows 100. The bellows' cross-section is of a generally inverted "omega" shape with outboard web 102 somewhat longer than inboard web 104. Web portions 102 and 104 are joined by a radially inner base portion 106 to form a single convolution.

At its radially outer end, inboard web 104 includes an axially extending annular flange 108. Flange 108 includes an axially extending cylindrical surface 110 in fluid-tight sealing engagement with axial cylindrical surface 37 of primary ring 20. It also includes a radially outboard cylindrical surface 112 in contact with finger spring 80, as will be explained in further detail.

Web 104 includes a radial inboard surface 114 in contact with outboard radial surface 30 of primary ring 20. It also includes a radial outboard surface 116 in contact with finger spring 80.

Outboard web 102 includes an axially extending flange 118. Flange 118 includes an axially extending, inner diameter cylindrical surface 120 including an inner directed bead 126 in fluid-tight sealing engagement with axial cylindrical seat wall 78 of retainer 70. It also includes a radially outer axially extending surface 122 and a radially extending annular surface 124, which contact finger spring 80.

Referring now to FIGS. 1, 2, 4 and 5, finger spring member 80 nested within the single convolution defined by bellows 100 provides the axial biasing force that causes the primary ring 20 to be urged toward mating ring 18. It includes a ferrule portion 82 associated with the flange 108 at primary ring 20, a ferrule portion 84 associated with the flange 118 at retainer 70. A plurality of spring fingers 86 connect ferrule portions 82 and 84. These spring fingers 86 are also generally of an inverted "U-shaped" cross-section, with one leg longer than the other.

Ferrule portion 82 includes a generally cylindrical axially extending portion 83 overlying web 108 at surface 112 and a generally radially extending annular portion 85 adjacent radial outboard surface 116 of web 104.

Ferrule portion 84 includes a generally cylindrical, axially extending portion 87 overlying web 118 at surface 122 and a generally radially extending annular portion 89 adjacent radial inboard surface 124 of web 102.

Each spring finger 86 includes a relatively short radial leg portion 92 connected to ferrule 82 at radial annular portion 85 and a relatively long radial leg portion 94 connected to ferrule 84 at radial annular portion 89. The leg portions are joined at a radially inner bend portion 95.

At its working height, shown in FIG. 2, the seal assembly components are positioned with respect to the housing 12 and shaft 16 such that the spring fingers 86 are deformed by movement of the ferrule portions 82,84 toward each other so that the radial annular portion 85 of ferrule 82 is brought toward the radial annular portion 89 of ferrule 84, thus placing the finger spring 80 in bending. At this working height, the restoring force from bending of fingers 86 causes the radial annular portion 85 to be urged away from the radial annular portion 89, thereby also axially biasing the axially extending annular flange 108 and radial outboard surface 116 of inboard radial web 104 inboard from the outboard radial web 102. The close contact between inboard surface 114 of inboard web 104 and the radial wall 30 of primary ring 20 causes the primary ring 20 to be biased toward mating ring 18, thus tending to bring the sealing faces 19 and 21 into contact.

In an operational embodiment for a shaft having a 12 millimeter diameter, the load on the spring is caused by a working height of approximately 1 millimeter.

At the working height, the spring 80 and the elastomeric bellows 100 causes the base 106 of bellows 100 to shift in position within the retainer 70 so that the bellows comes into contact with the radially extending curved wall portion 79. This is the normal seat position of the convolution of elastomeric bellows 100, which still permits some axial motion of the primary seal ring 20.

One feature provided by this particular arrangement of the inventive seal embodiment 10 is minimizing the axial and other loads on the bellows. For example, as the water pump begins operation, the fluid inboard of the elastomeric bellows 100 becomes pressurized to a pressure exceeding the ambient pressure outboard of the seal. This pressure tends to push at the walls, and especially at the longer radially extending surface of inner radial web 104 and of outer radial web 102 and thereby tending to deform the shape of the elastomeric bellows.

One feature provided in this embodiment is that the retainer 70, including the radially extending curved wall portion 79, provide both axial and radial support to the elastomeric bellows 100, which, at its central base 106 and outboard web 104, takes the shape provided by the retainer 70. The pressure created by the pump impeller therefore cannot deform the annular shape of the elastomeric bellows and thereby avoids opening of undesirable leak paths through the secondary seal, for example, by deforming the squeeze at the axially extending flange 118.

Although some incidental load on the seal ring 20 may be provided by the bellows 100, one feature of the arrangement is to isolate the bellows 100 from the axial forces acting on the seal. Thus, the primary function of the bellows 100 is to provide a secondary seal between the retainer 70 and the housing 12 and seal ring 20.

Providing a consistent and efficient secondary seal to the housing 12 is achieved through squeezing the bellows flange 118 within the cup-shaped receptacle defined by the retainer walls 72, 76, 78. Maintaining such a secondary seal creates special difficulties because of the pressure differential across the elastomeric bellows seal 100 produced during operation of the pump, and also due to the continual vibrational forces created during rotation of the shaft 16 by a motor or other device (not shown), disposed outboard of seal 110.

One feature of the present invention that facilitates in maintaining the secondary seal at the outboard end is an annular bead 126 centrally disposed on the axially extending surface 120 of flange 118. As is best illustrated in FIG. 3, the bead 126 extends inwardly of the planar axially extending surface 120. As the flange 118 is fit into the retainer 70, the bead 126 becomes squeezed against the axially extending cylindrical seat wall portion 78, and thereby creating a stronger interference fit between the flange 118 and retainer 70. At the inboard end of bellows 100, a secondary seal is formed by flange 108 surrounding seal ring 20.

Ferrule 82 is sized such that it applies a compressive force to axially extending annular flange 108 of web 104 to establish a fluid-tight relationship between the contacting surface of the ferrule 82 and flange 108 and the contacting surfaces of the flange 108 and primary ring 20. Ferrule 84 is sized such that it applies a compressive force to axially extending annular flange 118 of web 102 to establish a fluid-tight relationship between the contacting surfaces of ferrule 84 and flange 118.

The radial connection of cylindrical axial portion 83 of the finger spring 80 produces a radially inward force, which, together with the fluid pressure of the pumped fluid, maintains the secondary seal of the flange 108, which is pressed against the primary seal ring 18. The radially inwardly directed force of the cylindrical axial portion 83 is capable of maintaining a static seal between axially extending cylindrical surface 110 of flange 108 and outer diameter axial cylindrical surface 37 of the seal ring 20. For better sealing capability, cylindrical surface 110 presents a seal at the end of a tapered bead-like inner surface of flange 108, as shown, which also is squeezed radially inwardly to maintain the secondary seal against seal ring 20. An incidental axial force on the radially exposed wall 109 of flange 108 is countered by the corresponding axially directed opposite pressure force on radially outboard surface 116 and by the spring force of spring 80 acting axially on the flange 108.

Proper loading of the seal 10, for example, at a working height of about 1 mm for a seal intended for use with a 12 mm shaft, should ensure that there is no contact between the two radial annular portions 85,89 of ferrules 82,84. A seal for a 12 mm shaft size typically may have a "free" height, that is before preloading, as shown in FIG. 1, of about 14.2 mm. After preloading, with conventional instruments that measure the distance between the axial ends of seal 10, the typical minimum installed height may be about 13.1 mm.

Of course, axial motion in the direction tending to further bend the spring fingers 86 causes the spring force to increase, thus tending to bias the seal ring 20 against mating ring 18 even more strongly until the optimal load is achieved. Axial motion beyond a certain point is impeded by the contact of the radial annular portions 85, 89, but such contact must be avoided to prevent an undesirable increase on the load placed on seal ring 20. The typical separation between radial annular portions 85,87, under proper loading conditions, will be approximately about 0.5 to 1.0 mm, as shown in FIG. 2.

It should be noted that in the preloaded state, shown in FIG. 2, the leg of spring finger 86 which connects to ferrule 84 is subject to greater axial deflection than the leg connected to ferrule 82. This greater deflection results from the shape and configuration of the web 102, which provides for a separation between the spring finger 86 and wall surface of web 102. This is a preferred configuration because it is desirable to maintain the shape and configuration as close to square as possible in order to maintain the support of seal ring 20 and the fluid-tight secondary seal thereagainst. The final configuration of the spring 80 may be formed by one or several stamping steps prior to final assembly. Special customized stampings are ordinarily required to form the spring 80, and may be available from commercial precision stamping operations, such as American Engineered Components of Brighton, Mass., and Carla Place, N.Y. The finger spring member 80 is made of stainless steel and is preferably formed as a single integral component. The finger spring member 80 alternatively may be made as separate components riveted together or otherwise fastened to each other.

In a working embodiment, the materials of the elements can be standard sealing materials. Preferably, the mating ring 18 is made from silicon carbide (SiC) and the primary ring 20 may comprise either silicon carbide as shown in FIG. 2 or a standard carbon ring, as shown in FIG. 1. The bellows material is an elastomer such as molded rubber and the springs 80, including spring fingers 86, are stainless steel or spring steel. The sleeve 40 and retainer 70 are also stainless steel.

Dimensions of the elements may vary depending on the shaft size for which the seal 10 is intended. As an example, for a shaft size of 12 millimeters, the spring 80 may comprise a sheet of 301 or 316L stainless steel spring having a thickness of approximately 0.10 to 0.50 millimeters, with a preferable thickness of 0.15 millimeter. The dimensions, and especially the load provided in the free height state, may be critical to the operation of the seal. It is of course important that the dimension of the annular elastomeric bellows 100 match the dimensions of the retainer 70 and the seal ring 20 so that the elastomeric portions may be compressed to form the appropriate secondary seals.

Figure 6:
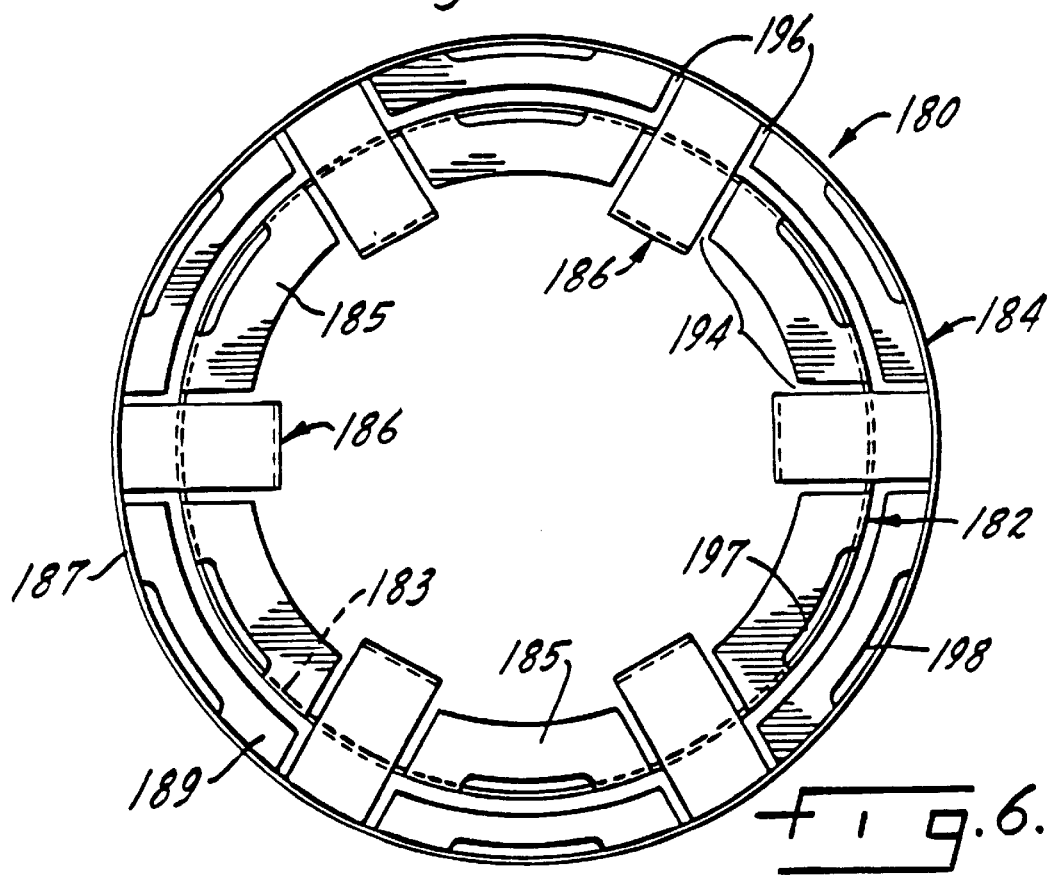
FIG. 6 is a plan view of a modified form of finger spring member.

An alternative configuration of a spring 180 is shown in FIG. 6, in which the ferrule 182,184 provides for additional flexibility in the seal. As shown in FIG. 6, the radial and axial intersection of the spring members 180 may be modified to reduce stiffness in the spring force provided by finger spring member 180. As shown in FIG. 6, various cuts and gaps in the web of the spring member 180 may be made, which increase the flexibility of the spring fingers.

Radially extending surfaces 185 and 189 of ferrules 182 and 184 may be cut adjacent the spring elements 186 so that the spring element connections to the ferrules 182, 184 are directly to the corresponding cylindrical axial portions 183, 187 respectively. A gap 194, provided between spring element 186 and radial portion 185, and gap 196, may be provided between spring element 186 and radial annular portion 189 so that the spring elements extend continuously to cylindrical wall portions 183, so that the spring elements 186 can flex relative to the respective ferrules 182,184 independently of any support derived from the radially extending annular members 185 and 189, respectively.

Additional flexibility may be provided, if desired, by making additional cutouts in the ferrules at the corners where the axial cylindrical portions 183, 187 connect to the respective radial annular portions 185, 189. For example, cutouts 197 in the corners of ferrule 182 and cutouts 198 in the corners of ferrule 184 provide flexibility in the movement of the ferrule elements relative to each other and to the web of the adjacent elastomeric bellows 100, without detracting in any way from the structural integrity of the finger spring 186. Cutouts 197,198 may take any shape, but, as shown, they comprise elongated ovals which follow the folds, created during the stamping process, that comprise the corners between the axial and radial portions of ferrules 182,184.

Although the invention is described and illustrated with respect to several preferred embodiments, a general understanding of the invention provides the basis for other modifications and alterations which may become readily apparent to a person having ordinary skill in the art. For example, the preferred embodiments have been described and illustrated in the context of a retainer 70. However, it is considered possible to design a seal configuration utilizing a spring arrangement without a retainer, in which the bellows arrangement is held in place by frictional fit against the shaft or housing by a separate attachment (not shown) and to the primary ring by the spring ferrule, such as ferrule 82. Elimination of the retainer, and elimination of the sleeve, may be possible while still providing the benefits derived from the features of the present invention. Accordingly, described and illustrated embodiments above are not to be construed as limiting the scope of the invention, which is only limited by the following claims.

What is claimed is:

1. A mechanical end face seal assembly to provide a fluid tight seal between a housing defining a bore and a rotatable shaft extending through the bore, said seal assembly comprising:

an annular seal ring adapted to be connected to one of the housing and shaft;

an annular seal ring adapted to be connected to the other of said housing and shaft;

said rings each having an annular, generally radially directed seal face in facing relation to the seal face of the other ring to define a sealing interface therebetween, one of said rings being axially movable relative to the other;

a resilient secondary seal between said axially movable ring and said one of said shaft and housing;

said resilient secondary seal member comprising an elastomeric bellows in fluid tight sealing contact with said axially movable ring and in fluid-tight sealing relation to said one of said housing and shaft;

a finger spring member interposed between said axially movable seal ring and said one of said housing and shaft;

said finger spring member including a plurality of spring fingers adapted to be deformed on installation of said seal assembly between said housing and shaft to provide a force upon said axially movable ring to urge it toward the other of said rings;

wherein said bellows includes a flange in fluid-tight sealing contact with said axially movable seal ring and a flange in fluid-tight sealing relation with said one of said shaft and housing and wherein said finger spring member includes a ferrule in overlapping engagement with said flange in fluid-tight sealing contact with said axially movable seal ring and a ferrule in overlapping engagement with said flange in fluid-tight sealing relation to said one of said shaft and housing.

2. A mechanical end face seal assembly as claimed in claim 1 wherein said finger spring member spring fingers are generally "U" shaped with generally parallel legs.

3. A mechanical end face seal assembly as claimed in claim 2 wherein one of said legs of each said spring fingers is longer than the other.

4. A mechanical end face seal assembly as claimed in claim 1 wherein said flanges of said bellows each include at least an axially directed cylindrical surface and each said ferrule includes an axially extending cylindrical surface in engagement therewith.

5. The seal assembly according to claim 1 wherein said bellows includes a single convolution between said flanges, and said finger spring member further comprises a metallic spring disposed within said convolution of said bellows for providing said force to said one of said rings.

6. The seal assembly according to claim 5 wherein said metallic spring further comprises stainless steel.

7. The seal assembly according to claim 1 wherein said assembly further comprises a shaft sleeve sealingly attached to said seal ring adapted to be connected to one of said housing or shaft, and a retainer adapted to be sealingly attached through said bellows to the other of said housing or said shaft.

8. A seal assembly according to claim 7 wherein said bellows includes a single convolution between said flanges, and said retainer includes a generally radially directed curved surface to support said single convolution of said bellows.

9. A seal assembly according to claim 8 wherein said sleeve is adapted to be connected to the shaft and said retainer is adapted to be connected to the housing.

* * * * *